Patented Feb. 4, 1941

2,230,390

UNITED STATES PATENT OFFICE 2,230,390

PROCESS FOR THE PRODUCTION OF THIOLS

Frank K. Signaigo, Wilmington, Del., assignor to E. I. du Pont de Nemours & Company, Wilmington, Del., a corporation of Delaware No Drawing. Application August 11, 1939, Serial No. 289,581

19 Claims. (Cl. 260—609)

This invention relates to a new and improved process for the production of thiols and more particularly to the production of primary thiols by the catalytic hydrogenation of nitriles in the presence of a source of hydrogen sulfide.

Thiols have been prepared by catalytic hydrogenation of carboxylic acids, their salts and esters in the presence of hydrogen sulfide or materials that yield hydrogen sulfide under the reaction conditions. Such processes, however, are limited in their usefulness since yields are indifferent, high temperatures are required, and when acids are used as raw materials serious corrosion problems are encountered.

Thiols have also been prepared by passing a mixture of a primary alcohol vapor and hydrogen sulfide at elevated temperatures over catalysts such as thoria. This process, however, does not lend itself readily to commercial use in view of the low yields that have been reported.

This invention has as its object the preparation of thiols by a new and improved method. Another object is the preparation of primary thiols by a simple and direct process. Still another object is the preparation of thiols from readily available raw materials. Other objects will be apparent from a reading of the following description of the invention.

These objects are accomplished by the following invention which comprises reacting an organic compound containing the cyano group with hydrogen and hydrogen sulfide in the presence of a sulfactive catalyst.

An organic compound containing the cyano group is charged into an autoclave together with a sulfactive hydrogenation catalyst, hydrogen and hydrogen sulfide, or more conveniently with a suitable amount of sulfur which will be converted into hydrogen sulfide during the preliminary stages of the reaction. The autoclave is sealed, agitated by shaking, and heated to a temperature of 150° C. Additional hydrogen is added to the autoclave as needed from high pressure storage cylinders in order to maintain the partial pressure of hydrogen in the autoclave in the range from 500 to 3000 lbs./sq. in. After the reaction is completed, as evidenced by no further drop in pressure, the autoclave is cooled and the contents rinsed out with a suitable solvent. The catalyst is separated from the product by filtration and the product is subjected to distillation. Depending upon the particular nitrile processed, the exact manner of practicing this invention will vary somewhat as illustrated in the following examples.

EXAMPLE I

On hundred grams of lauronitrile and 45 grams of sulfur are charged into a high pressure autoclave, together with 15 grams of a cobalt polysulfide catalyst prepared by precipitating cobalt polysulfide from a solution of cobaltous chloride with a solution of sodium polysulfide. Hydrogen is admitted to the autoclave to a pressure of 2000 lbs./sq. in. and the autoclave is heated to a temperature of 150° C. As the reaction proceeds the pressure decreases rapidly and more hydrogen is added from time to time to maintain the total pressure in the range from 1000 to 2000 lbs./sq. in. When the rate of reaction slows down appreciably, the temperature is raised to 175° C. After six hours the reaction is complete, as evidenced by no further decrease in pressure. The autoclave is cooled, and the product rinsed out with ether and filtered to remove the catalyst. The ether solution is boiled to remove the hydrogen sulfide and ammonia formed. Titration of an aliquot of the solution with standard iodine indicates the conversion to dodecanethiol-1 to be 88%. The product is then fractionally distilled to separate the ether solvent from the thiol. In this way there is obtained 82 grams of a colorless liquid boiling principally at 155° C./26 mm. Analysis indicates the product to contain 15.5% of thiol sulfur corresponding to a purity of 97.5% as dodecanethiol-1; refractive index $$N_D^{25}=1.4558;\ D_4^{25}=0.8411$$

From the distillation residue there is obtained by recrystallization from ethanol 10 grams of a white solid, M. P. 99° to 100° C., which by mixed melting point with a known sample is shown to be lauramide, presumably formed by reaction of the intermediate thiolauramide with a small amount of water introduced with the catalyst.

EXAMPLE II

One hundred grams of palmitonitrile, 32 grams of sulfur, 45 grams of acetic acid and 15 grams of cobalt sulfide catalyst prepared as in Example I are charged into an autoclave and hydrogen is admitted to a pressure of 2400 lbs. per sq. in. The autoclave is then heated to 150° C. and rapid reaction occurs as evidenced by the decrease in pressure. The total pressure is maintained in the range from 1500 to 2600 lbs./sq. in. by the addition of more hydrogen. After four hours the total decrease in pressure has amounted to 2600 lbs./sq. in. The product is rinsed from the autoclave with ether and the solution filtered from the catalyst. The ether solution is washed with water to remove the acetamide formed. The solution is then distilled and there is obtained after removal of the solvent fraction, 87 grams of colorless liquid, B. P. 150° C. at approximately 1 mm. pressure. Analysis shows it to contain 10.1% of thiol sulfur corresponding to a purity of 81% as hexadecanethiol-1. The solid residue from distillation on recrystallization from ethanol melts at 50° to 51° C. and contains 11.85% sulfur corresponding to palmitic thioamide.

EXAMPLE III

Into a high pressure autoclave there is charged 103 grams of benzonitrile, 45 grams of sulfur, and 15 grams of a sulfactive catalyst prepared as in Example I. Hydrogen is forced into the autoclave to a total pressure of 1500 lbs. per sq. in., and the autoclave and contents are heated to a temperature of 150° to 175° C. Additional hydrogen is added to maintain the total pressure in the range from 1000 to 2500 lbs./sq. in. After six hours the total decrease in pressure has amounted to 4100 lbs./sq. in., and no further absorption occurs. The product is rinsed from the cooled autoclave with ether and the solution boiled to remove hydrogen sulfide and ammonia. Titration of an aliquot with standard iodine indicates a conversion to phenylmethanethiol of 62.5%. On distillation there is obtained 71 grams of colorless liquid boiling at 87° C./18 mm.; refractive index $$N_D^{25} = 1.5729$$

density $$D_4^{25} = 0.8097$$

thiol sulfur=25.3%. This corresponds to a purity of 98.5% as phenylmethanethiol. There are also obtained a few grams of benzamide.

EXAMPLE IV

A sulfactive catalyst is prepared by treating a methanol suspension of finely divided, pyrophoric cobalt metal with hydrogen sulfide until no more hydrogen sulfide is taken up. Ten grams of the sulfided cobalt catalyst so prepared, together with 52 grams of caprylonitrile and 32 grams of sulfur, are charged into an autoclave. Hydrogen is admitted to a pressure of 1500 lbs./sq. in. and the temperature is raised to 150° C. Additional hydrogen is added as needed and after five hours the absorption of hydrogen has ceased. After removal of the catalyst by filtration, the ether solution of the product is boiled to remove hydrogen sulfide and ammonia. Titration of an aliquot with iodine solution indicates a conversion to octanethiol-1 of 72%. On distillation there is obtained 40 grams of colorless liquid, B. P. 83° to 84° C./16 mm.; density $$D_4^{25} = 0.8349$$

refractive index $$N_D^{25} = 1.4460$$

The distillate contains 17.2% of thiol sulfur corresponding to a purity of 79% as octanethiol-1.

EXAMPLE V

One hundred twenty-five grams of caproic nitrile and 50 grams of hydrogen sulfide are heated at 150° C. in an autoclave for seven hours. On subjecting the product to distillation, there is obtained as a distillate 41 grams of unconverted caproic nitrile, together with a difficulty volatile residue weighing 88 grams. The latter is then charged, together with 10 grams of cobalt sulfide catalyst and hydrogen at 2200 lbs./sq. in. pressure, into a small autoclave and heated at 175° C. for five hours. The autoclave is cooled and the catalyst separated from the product by filtration and the ether solution of product boiled to remove hydrogen sulfide and ammonia. On distillation there is obtained 35 grams of a colorless liquid boiling at 84° C./100 mm. The product has a refractive index $$N_D^{25} = 1.4460$$

and density $$D_4^{25} = 0.8367$$

Titration of a sample of the distillate with standard iodine indicates the product to be hexanethiol-1 of 99% purity.

EXAMPLE VI

Seventy grams of sebaconitrile, 40 grams of sulfur, 110 grams of benzene, and 15 grams of a hydrogenating metal sulfide catalyst are charged into an autoclave, together with hydrogen, at 2000 lbs./sq. in. pressure. The autoclave is heated at 175° C. for four hours, more hydrogen being added from time to time to maintain the pressure in the range from 1200 to 2600 lbs./sq. in. The total pressure decrease amounts to 3400 lbs./sq. in. The product is filtered to remove the catalyst and the benzene solution of product is boiled to remove hydrogen sulfide and ammonia. Titration of an aliquot of the solution indicates the presence of 0.66 equivalent of thiol. The product is distilled at reduced pressure and there is obtained after removal of the solvent, 50 grams of a colorless liquid boiling at 155° C./7 mm. The product contains 30.2% of thiol sulfur, corresponding to a purity of 97.5% as decanedithiol,-1, 10. There is also obtained as a distillation residue 20 grams of solid which after recrystallization from ethanol melts at 83° to 87° C. and contains 15.7% of thiol sulfur and 5.5% of nitrogen, corresponding approximately to 10-thiolcapric amide.

The above experiment is repeated under similar conditions except that adiponitrile is substituted for the sebaconitrile above. In this way there is obtained analogously hexanedithiol-1,6, B. P. 99° to 102° C./9 mm.

EXAMPLE VII

Into a small autoclave there are charged 98 grams of crude oleonitrile, 32 grams of sulfur and 15 grams of a sulfactive hydrogenation catalyst. The autoclave is heated at 150° to 175° C. under hydrogen at 1400 to 2500 lbs./sq. in. pressure for five hours. After the absorption of hydrogen has ceased, the autoclave is cooled and the product rinsed from the bomb with ether. The product is then heated under vacuum to remove solvent, hydrogen sulfide and ammonia. The resulting oil contains 9% of thiol sulfur and shows an iodine number of 140 to 150. After correction of the iodine number for the amount of thiol present, the iodine number due to unsaturation is 104 to 114.

EXAMPLE VIII

Seventy-seven grams of acetic anhydride are added slowly to 84 grams of 6-aminocaproic nitrile. The resulting mixture of acetic acid and 6-acetaminocaproic nitrile together with 40 grams of sulfur and 15 grams of sulfactive catalyst are charged into a small autoclave. Hydrogen is forced in to a pressure of 2000 lbs./sq. in. and the autoclave and contents are heated to a temperature of 150° C. After six hours the absorption of hydrogen has ceased and the autoclave and contents are cooled. The product is rinsed from the autoclave with ether and filtered to remove the catalyst. On distillation there is obtained, after removal of solvent and acetamide formed, 67 grams of liquid boiling at 142° to 156° C./3 mm. This liquid contains 17.4% of thiol sulfur corresponding to a purity of 96% as 6-acetaminohexanethiol-1. The refractive index is $$N_D^{25} = 1.4968$$

and the density is $$D_4^{25} = 1.0093$$

In the foregoing examples I have indicated specifically certain nitriles that may be converted into the corresponding thiols according to this invention. However, this invention is not limited to these particular materials, and the catalytic hydrogenation in the presence of hydrogen sulfide of other organic compounds containing the cyano group is considered likewise to be a part of this invention. The nitriles may be aliphatic, cycloaliphatic or aromatic in nature and may contain one or more cyano groups. As examples of materials in addition to those cited in the foregoing examples, there may be mentioned the aliphatic mononitriles such as propionitrile, butyronitrile, hydrogen cyanide, valeronitrile, pelargonotrile, myristonitrile, stearonitrile; the aliphatic dinitriles and polynitriles such as oxalonitrile, that is (CN)$_2$, succinonitrile, glutaronitrile, azelaonitrile, suberonitrile, polyacrylonitrile, polymethacrylonitrile; aromatic nitriles such as toluic nitriles, naphthoic nitriles, and phthalonitriles; the cycloaliphatic nitriles such as hexahydrobenzonitrile, hexahydrophthalonitrile, and the nitriles of abietic and naphthenic acids, etc. In place of the aforementioned nitriles, preformed thioamides may be used, e. g., thiolauramide, thiostearamide, thiooleiamide, N-isobutylthiolauramide, N-methylthiostearamide, N-amylthiocaprylamide, N,n-dodecylthiobenzamide, N,N'-di-n-octyldithioadipamide, etc. Dithiols may be obtained from dinitriles but by proper choice of conditions it is also possible to obtain other products from dinitriles. For example, the reaction may be interrupted before completion in order to obtain substantial amounts of thiolnitriles or thiol-thioamides. Or if a solvent is not used and the reaction is not pushed to completion, polymeric products are obtained which contain a high ratio of sulfur to nitrogen, and in many cases approximate polythioethers or polydisulfides in composition.

In addition to the above mentioned simple nitriles, the conversion of compounds containing in addition to the cyano group other functional groups, to the corresponding thiols constitutes a part of this invention. For example, the nitrile may also contain such functional groups as the carbon-to-carbon double bond, hydroxyl, amino, aldehydo, keto groups or halogen. As examples of some of these may be cited epsilon-aminocapronitrile, ketostearonitrile, hydroxystearonitrile, levulinonitrile and acetonecyanohydrin.

In the case of alpha-beta-unsaturated nitriles, aldehydo- and ketonitriles, dithiols may be produced. From alpha-beta-unsaturated nitriles, the dithiols may be formed by conversion of the cyano group to thiol and by addition of hydrogen sulfide to the carbon-to-carbon double bond. In the case of aldehydo- and ketonitriles, the dithiols will be produced by conversion of cyano groups to thiols according to this invention and at the same time the keto or aldehydo groups will be converted to thiols according to the processes described in copending application Serial No. 289,580, filed August 11, 1939.

The hydrogenation of nitriles in the presence of hydrogen sulfide may take place in more than one stage. In the first stage the nitrile may react with the hydrogen sulfide to form the corresponding thioamide or other product. In the later stages these products may react with hydrogen in the presence of the sulfactive catalyst to form the thiol. While both stages are conveniently carried out together as described in most of the foregoing examples, it is also considered to be a part of this invention to react nitriles with hydrogen sulfide in any convenient manner and to subject the reaction products to hydrogenation over a sulfactive catalyst under the conditions already set forth so as to obtain the corresponding thiols (see Example V).

In the foregoing examples certain definite reaction conditions have been indicated. It is to be understood that these values may be varied somewhat within the scope of this invention, since the conditions of each experiment will be determined by the particular compounds treated. In general, the processes of this invention are operable at temperatures ranging from 75° to 300° C. and at pressures ranging from atmospheric upwards. It is necessary, however, to maintain a pressure higher than the pressure due to hydrogen sulfide in the reaction vessel in order that a suitable pressure of hydrogen be present. It is preferred to operate at temperatures of 100° to 200° C. and under total pressure of 500 to 5000 lbs./sq. in.

Instead of charging hydrogen sulfide into the reaction vessel as such, substances that yield hydrogen sulfide under the reaction conditions may be used. For example, elementary sulfur, carbon bisulfide or sulfur dioxide may be substituted for hydrogen sulfide. The proportion of hydrogen sulfide or substances yielding hydrogen sulfide used may be varied considerably, but it is desirable that an excess over the amount theoretically required be used. In general, at least one mole of hydrogen sulfide or an equivalent amount of a substance convertible to hydrogen sulfide will be used for each equivalent of nitrile.

The proportion of catalyst used may be varied considerably. In general, an amount of catalyst is used that will bring about the reaction at a suitable rate. The type of sulfactive catalyst employed may likewise vary considerably. In general, the common hydrogenating metals and their sub-sulfides, and polysulfides, are effective. Especially useful are the sulfides or polysulfides of the metals copper, lead, silver, molybdenum, manganese, iron, cobalt and nickel or combinations of these. The finely divided sulfides may be used as such, or they may be supported on suitable inert carriers such as kieselguhr, alumina, etc. The above catalysts are referred to herein as sulfactive. It will be noted that the above catalysts are active in promoting a reaction in which one of the reactants is sulfur or a sulfur compound capable of yielding hydrogen sulfide under the reacting conditions, said catalyst being especially adapted for the removal of sulfur unsaturation in organic compounds.

The method of preparation of typical sulfactive catalysts is described in the foregoing examples, but other methods of preparation may be employed. In general, metal sulfides may be formed by precipitation methods or by sulfidation of the metals or their compounds at ordinary or elevated temperatures by means of sulfur, hydrogen sulfide, or other sulfur compounds. The activity of certain of the metal sulfide catalysts may be improved by treatment with hydrogen at elevated temperatures. The partial or complete sulfidation or reduction treatment of the catalyst may take place during the preliminary stages of its use in the processes of this invention.

The process may be carried out in the absence of solvents or in the presence of organic solvents as, for example, ethanol, dioxan, or benzene. It is also frequently desirable to use a substance that will neutralize the ammonia formed. For this purpose such materials as acids, anhydrides, or esters may be used as, for example, acetic acid, acetic anhydride, and methyl formate. If water is present during the reaction some hydrolysis of the nitrile or intermediate compounds may occur.

This invention is used for the preparation of primary thiols and compounds which contain the thiol group in addition to other functional groups. The thiols so produced are valuable products having many industrial uses, either as such or as intermediates in the manufacture of other important products. For example, the thiols are converted by mild oxidation into disulfides or by more energetic oxidation into sulfonic acids, many of which have valuable surface-active properties. Compounds containing the thiol groups are likewise useful as rubber chemicals, insecticides, etc.

This invention offers many advantages over the prior art from the standpoint of economy and efficiency. It comprises a novel and effective catalytic process by which nitriles are converted in a single operation and in high yields into thiols. By this means a wide variety of primary thiols can be obtained by economical methods where heretofore a complicated series of reactions were necessary.

It is apparent that many widely different embodiments of this invention may be made without departing from the spirit and scope thereof and therefore it is not intended to be limited except as indicated in the appended claims.

I claim:

1. The process which comprises catalytically hydrogenating in the presence of hydrogen sulfide an organic compound containing a cyano group.

2. The process which comprises reacting an organic compound containing a cyano group with hydrogen and a substance selected from the group consisting of elementary sulfur, hydrogen sulfide, and compounds capable of yielding hydrogen sulfide under the conditions of reaction, in the presence of a sufactive hydrogenation catalyst.

3. The process in accordance with claim 2 characterized in that the organic compound is an aliphatic mononitrile.

4. The process in accordance with claim 2 characterized in that the organic compound is lauronitrile.

5. The process in accordance with claim 2 characterized in that the organic compound is an aliphatic dinitrile.

6. The process in accordance with claim 2 characterized in that the organic compound is sebaconitrile.

7. The process in accordance with claim 2 characterized in that the organic compound is an aromatic nitrile.

8. The process in accordance with claim 2 characterized in that the organic compound is benzonitrile.

9. The process in accordance with claim 2 characterized in that the catalyst is a sulfide of a metal of the iron group of the periodic table.

10. The process in accordance with claim 2 characterized in that the catalyst is cobalt sulfide.

11. The process in accordance with claim 2 characterized in that the catalyst is nickel sulfide.

12. The process in accordance with claim 2 characterized in that the catalyst is molybdenum sulfide.

13. The process which comprises reacting an organic compound containing a cyano group with hydrogen sulfide and thereafter reacting the resulting product with hydrogen in the presence of a sulfactive hydrogenation catalyst.

14. The process which comprises reacting an organic thioamide with hydrogen in the presence of a sulfactive hydrogenation catalyst.

15. The process which comprises reacting an organic compound containing a cyano group with hydrogen and sulfur in the presence of a sulfactive hydrogenation catalyst.

16. The process which comprises reacting an organic compound containing a cyano group with hydrogen and hydrogen sulfide in the presence of a sulfactive hydrogenation catalyst.

17. The process for the preparation of organic thiols which comprises catalytically hydrogenating an organic nitrile in the liquid phase in the presence of hydrogen sulfide at a temperature between 75° and 300° C. and under a total pressure in excess of the partial pressure due to hydrogen sulfide.

18. The process for the preparation of organic thiols which comprises reacting an organic nitrile in the liquid phase with hydrogen and hydrogen sulfide in the presence of a sulfactive hydrogenation catalyst at a temperature between 75° and 300° C. and under a total pressure in excess of the partial pressure due to hydrogen sulfide.

19. The process for the preparation of organic thiols which comprises reacting an organic nitrile with hydrogen sulfide and thereafter catalytically hydrogenating the resulting product in the liquid phase at a temperature between 75° and 300° C. and under a superatmospheric pressure.

FRANK K. SIGNAIGO.